United States Patent
Cromer et al.

(10) Patent No.: US 7,571,332 B2
(45) Date of Patent: Aug. 4, 2009

(54) REDUCING POWER CONSUMED BY A COMPUTER SYSTEM DURING A HIBERNATION OR AN OFF STATE BY REMOTELY WAKING UP THE COMPUTER SYSTEM

(75) Inventors: Daryl Carvis Cromer, Apex, NC (US); Brandon Jon Ellison, Raleigh, NC (US); Eric Richard Kern, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 443 days.

(21) Appl. No.: 11/150,955

(22) Filed: Jun. 13, 2005

(65) Prior Publication Data

US 2006/0282690 A1  Dec. 14, 2006

(51) Int. Cl.
*G06F 1/00* (2006.01)
(52) U.S. Cl. ............... 713/310; 713/300; 370/389; 370/463
(58) Field of Classification Search ........... 713/300, 713/310; 370/463, 389
See application file for complete search history.

(56) References Cited

U.S. PATENT DOCUMENTS

| | | | | |
|---|---|---|---|---|
| 5,915,119 | A * | 6/1999 | Cone | 713/310 |
| 5,938,771 | A * | 8/1999 | Williams et al. | 713/310 |
| 6,101,608 | A | 8/2000 | Schmidt et al. | 713/202 |
| 6,311,276 | B1 | 10/2001 | Connery et al. | 713/201 |
| 6,366,957 | B1 * | 4/2002 | Na | 709/229 |
| 6,493,824 | B1 | 12/2002 | Novoa et al. | 713/162 |
| 6,526,507 | B1 | 2/2003 | Cromer et al. | 713/162 |
| 6,606,709 | B1 | 8/2003 | Connery et al. | 713/201 |
| 6,694,440 | B1 * | 2/2004 | Ishibashi | 713/310 |
| 6,697,383 | B1 | 2/2004 | Li et al. | 370/510 |
| 6,697,873 | B1 * | 2/2004 | Yik et al. | 709/238 |
| 6,762,675 | B1 * | 7/2004 | Cafiero et al. | 340/10.42 |
| 6,952,785 | B1 * | 10/2005 | Diab et al. | 713/300 |
| 7,107,442 | B2 * | 9/2006 | Cheshire | 713/1 |
| 7,117,377 | B2 * | 10/2006 | Hagiwara et al. | 713/300 |
| 7,188,264 | B2 * | 3/2007 | Morisawa | 713/300 |
| 7,231,535 | B2 * | 6/2007 | Le Creff et al. | 713/340 |

(Continued)

FOREIGN PATENT DOCUMENTS

JP    2002/044177 A    8/2002

*Primary Examiner*—Mark Connolly
*Assistant Examiner*—Jaweed A Abbaszadeh
(74) *Attorney, Agent, or Firm*—Robert A. Voight, Jr.; Winstead P.C.; Carlos Munoz-Bustamante

(57) ABSTRACT

A method and system for reducing power consumed by a computer system. A network switch includes a processor coupled to a plurality of ports which are coupled to a plurality of computer systems. The processor includes logic for receiving a media access control address from one of the computer systems. The computer system may later enter into either a hibernation state or an off state. The processor may further include logic for receiving a magic packet that includes a repetitive address that identifies the computer system. Upon receiving the magic packet, the processor remotely activates the computer system from either the hibernation state or the off state. By remotely activating the computer system, the computer system may consume less power since the network subsystem in the computer system may not need to monitor for a magic packet. Instead, the magic packet may be monitored by the network switch.

13 Claims, 5 Drawing Sheets

U.S. PATENT DOCUMENTS

| | | | |
|---|---|---|---|
| 7,320,078 B2 * | 1/2008 | Balestriere | 713/300 |
| 7,327,743 B2 * | 2/2008 | Lehr et al. | 370/401 |
| 2003/0028677 A1 * | 2/2003 | Fukuhara | 709/250 |
| 2003/0202514 A1 | 10/2003 | Cromer et al. | 370/392 |
| 2004/0041697 A1 * | 3/2004 | Nattkemper et al. | 340/310.01 |
| 2004/0205234 A1 * | 10/2004 | Barrack et al. | 709/238 |
| 2004/0246961 A1 * | 12/2004 | Dai et al. | 370/392 |
| 2005/0058087 A1 * | 3/2005 | Beach et al. | 370/257 |
| 2005/0114719 A1 * | 5/2005 | Stedman et al. | 713/310 |
| 2005/0243861 A1 * | 11/2005 | Elkayam et al. | 370/466 |
| 2006/0007924 A1 * | 1/2006 | Sadot | 370/389 |
| 2006/0034318 A1 * | 2/2006 | Fernandes et al. | 370/463 |
| 2006/0041683 A1 * | 2/2006 | Subramanian et al. | 709/245 |
| 2006/0056397 A1 * | 3/2006 | Aizu et al. | 370/352 |
| 2006/0067357 A1 * | 3/2006 | Rader | 370/463 |
| 2006/0075269 A1 * | 4/2006 | Liong et al. | 713/300 |
| 2006/0136754 A1 * | 6/2006 | Liu et al. | 713/300 |
| 2006/0277421 A1 * | 12/2006 | Balestriere | 713/300 |
| 2008/0250496 A1 * | 10/2008 | Namihira | 726/22 |

* cited by examiner

REDUCING POWER CONSUMED BY A COMPUTER SYSTEM DURING A HIBERNATION OR AN OFF STATE BY REMOTELY WAKING UP THE COMPUTER SYSTEM

TECHNICAL FIELD

The present invention relates to the field of a data processing system, and more particularly to reducing the power consumed by a computer system during a hibernation or an off state by remotely waking up the computer system.

BACKGROUND INFORMATION

The United States government has been helping businesses and individuals protect the environment through superior energy efficiency by backing programs, such as Energy Star. Energy Star is dynamic government/industry partnership that offers businesses and consumers energy-efficient solutions. For example, Energy Star published specifications for the maximum amount of power that a computer system should consume during particular states, such as a "hibernation state" and an "off state".

In the "hibernation state", the computer is operating in a power saving mode of operation in order to reduce power consumption. A computer system may be invoked to enter the hibernation state after a period of inactivity or upon a user invoking the computer system to enter the hibernation state. Upon entering hibernation, the computer system stores the contents of the system state information in a non-volatile storage unit, e.g., disk drive, flash Read Only Memory (ROM). During the hibernation state, the computer system consumes power to support the network subsystem. For example, the computer system may consume power to maintain activation of the network interface card. The network interface card may include logic configured to monitor a "magic packet" used to indicate to the computer system to "power up" to operate in the normal mode of operation. A magic packet may refer to a frame sent to the computer system in a network, e.g., local area network, that includes the destination address, e.g., address of the computer system, repeated a certain number of times, e.g., sixteen times, within the packet.

Similarly, in the "off state", when the computer system is deactivated or turned off, the computer system may consume power to maintain activation of the network interface card. As discussed above, the network interface card may include logic configured to monitor a magic packet to indicate to the computer system to "power up" to operate in the normal mode of operation.

As stated above, Energy Star has published specifications for the amount of power that a computer system should consume during certain states, such as the hibernation state and the off state. Currently, Energy Star has specified that a computer system should consume no more than 2 watt of power during such states. Energy Star may later publish even more stringent specifications specifying that computer systems consume less than 2 watt of power during such states.

Therefore, there is a need in the art to reduce the power consumed by a computer system during the hibernation and the off state to comply with the Energy Star specifications.

SUMMARY

The problems outlined above may at least in part be solved in some embodiments by a network switch remotely activating a computer system operating in a hibernation state or in an off state. By remotely activating the computer system, the computer system may consume less power since the network subsystem in the computer system may not need to monitor for a magic packet. Instead, the magic packet may be monitored by the network switch.

In one embodiment of the present invention, a method for reducing power consumed by a computer system may comprise the step of receiving a media access control address from an activated computer system. The method may further comprise associating the received media access control address with a particular port. The method may further comprise entering either a hibernation state or an off state by the computer system. The method may further comprise receiving a magic packet that includes a repetitive address that identifies the computer system. The method may further comprise remotely activating the computer system from either the hibernation state or the off state upon receipt of the magic packet.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method and system for reducing power consumed by a computer system. In one embodiment of the present invention, a network switch includes a processor coupled to a plurality of ports which are coupled to a plurality of computer systems. The processor includes logic for receiving a media access control address from one of the computer systems. The computer system that sent the media access control address may later enter into either a hibernation state or an off state. The processor may further include logic for associating the received media access control address with a particular port. The processor may further include logic for receiving a magic packet that includes a repetitive address that identifies the computer system. Upon receiving the magic packet, the processor remotely activates the computer system from either the hibernation state or the off state. By remotely activating the computer system by the network switch, the computer system may consume less power since the network subsystem in the computer system may not need to monitor for a magic packet. Instead, the magic packet may be monitored by the network switch.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
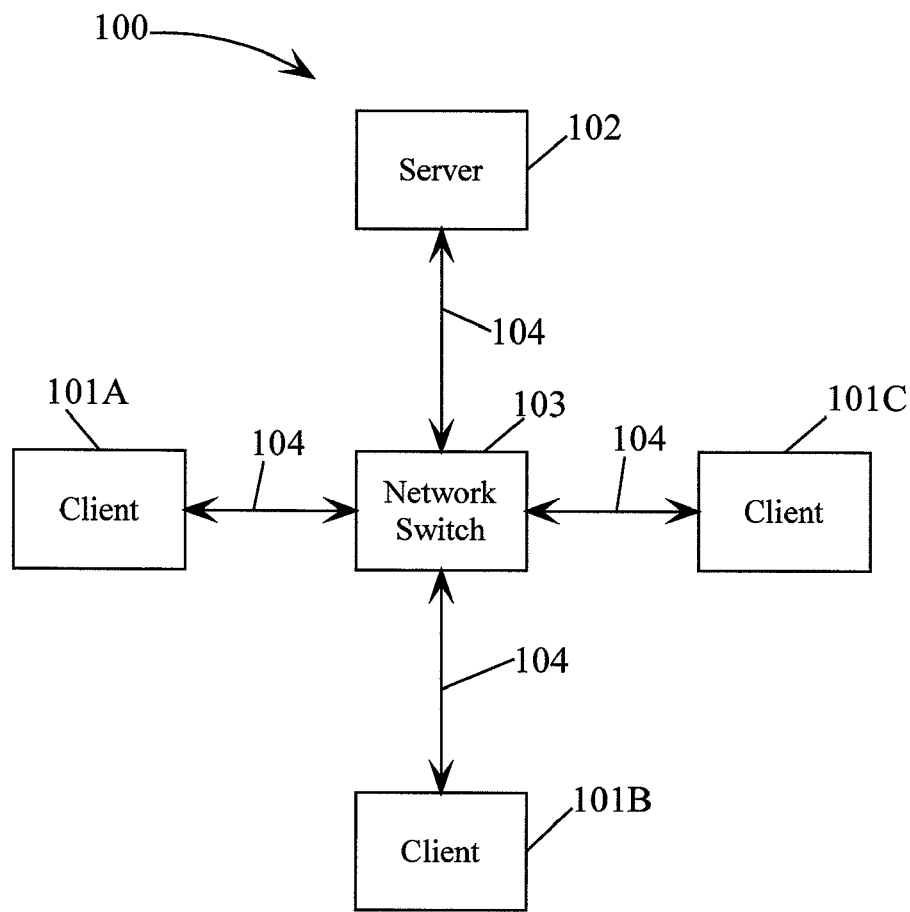
FIG. 1 illustrates a network system in accordance with an embodiment of the present invention.

FIG. 1—Network System

FIG. 1 illustrates an embodiment of the present invention of a network system 100 including a plurality of client computer systems 101A-C coupled to a server 102 utilizing a network switch 103. Client computer systems 101A-C may collectively or individually be referred to as clients 101 or client 101, respectively. A more detail description of client 101 is provided below in association with FIG. 2. In one embodiment, network switch 103 may be configured to cross connect stations or Local Area Network (LAN) segments. A more detail description of network switch 103 is provided below in association with FIG. 3.

Referring to FIG. 1, client 101 may be configured to receive and transmit packets of data to server 102 via network switch 103. In one embodiment, server 102 is connected to network switch 103 via a LAN connector bus 104. Clients 101 may also be connected to network switch 103 via LAN connector busses 104. In one embodiment, network system 100 conforms to the Ethernet specification and uses such network switches 103. It will be appreciated, however, that other forms of networks, such as a token ring, may be utilized to implement network system 100.

A "network" may include any type of data communications channel, such as an Ethernet network, token ring, X.10, or X.25. Those skilled in the art will recognize that embodiments of the present invention described herein may be implemented utilizing any type of data communications channel.

FIG. 2—Client

Figure 2:
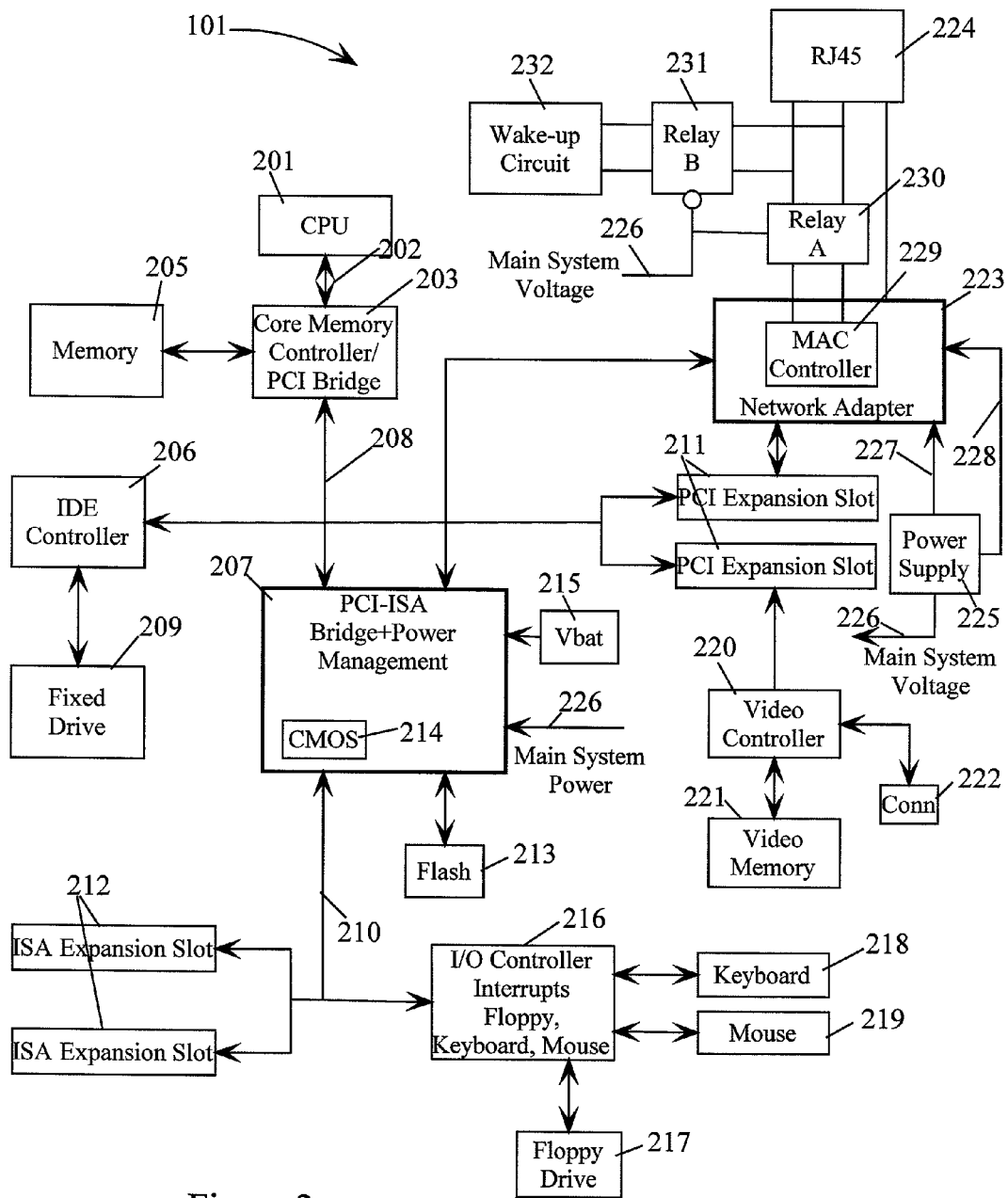
FIG. 2 illustrates an embodiment of the present invention of a client in the network system.

FIG. 2 illustrates an embodiment of the present invention of a client 101 (FIG. 1). Referring to FIG. 2, client 101 includes a central processing unit (CPU) 201 which is connected by address, control, and data busses 202 to a memory controller and peripheral component interconnect (PCI) bus bridge 203 which is also coupled to a system memory 205. An integrated drive electronics (IDE) device controller 206 and a PCI bus to Industry Standard Architecture (ISA) bus bridge 207 are connected to PCI bus bridge 203 utilizing a PCI bus 208. IDE controller 206 provides for the attachment of IDE compatible storage devices such as a fixed disk drive 209. PCI/ISA bridge 207 provides an interface between PCI bus 208 and an optional feature or expansion bus such as an ISA bus 210. PCI/ISA bridge 207 includes power management logic. A PCI standard expansion bus with connector slots 211 is coupled to PCI bridge 203. PCI connector slots 211 may receive PCI bus compatible peripheral cards. An ISA standard expansion bus with connector slots 212 is connected to PCI/ISA bridge 207. ISA connector slots 212 may receive ISA compatible adapter cards (not shown). It will be appreciated that other expansion bus types may be used to permit expansion of client 101 with added devices. It should also be appreciated that two expansion busses are not required to implement the present invention.

PCI-ISA bridge controller 207 includes an interface for a flash memory 213, which includes microcode which client 101 executes upon power-on. Flash memory 213 may be an electrically erasable programmable read only memory (EEPROM) module and includes BIOS that is used to interface between the I/O devices and the operating system. PCI-ISA bridge controller 207 also includes a CMOS storage 214 that holds initialization settings which represent system configuration data. Storage 214 includes values which describe the present configuration of client 101. For example, storage 214 includes information describing the list of initial program load (IPL) devices set by a user and the sequence to be used for a particular power method, the type of display, the amount of memory, time date, etc. Furthermore, this data is stored in storage 214 whenever a special configuration program, such as configuration/setup is executed. PCI-ISA bridge controller 207 is supplied power from a battery 215 to prevent loss of configuration data in storage 214.

An I/O controller 216 is coupled to PCI-ISA bridge controller 207. I/O controller 216 controls communication between PCI-ISA bridge controller 207 and devices and peripherals such as a floppy drive 217, keyboard 218, and mouse 219 so that these devices may communicate with CPU 201.

Client system 101 may further include a video controller 220 which may, for example, be plugged into one of connector slots 211. Video controller 220 is connected to video memory 221. The image in video memory 221 is read by controller 220 and displayed on a monitor (not shown) which is connected to client 101 through a connector 222.

Client system 101 may further include a network adapter 223 which may, for example, be plugged into one of the PCI connector slots 211 (as illustrated) or one of the ISA connector slots 212 in order to permit client 101 to communicate with a LAN via connector 224 to network switch 103 (FIG. 1).

Client computer system 101 may further include a special power supply 225 which supplies full normal system power 226, and has an auxiliary power main AUX 227 which supplies full time auxiliary power to a power management logic 207 and to network adapter 223. This enables client 101 to respond to a wakeup signal, as discussed further below, from network adapter 223. In response to a receipt of the wakeup signal, power supply 225 is turned on and then powers up client 101. In one embodiment, power supply 225 outputs a POWERGOOD signal 228 when power supply 225 outputs a stable system power. POWERGOOD signal 228 may be received by PCI-ISA bridge and power management 207.

Referring to FIG. 2, network adapter 223 may include a Media Access Control (MAC) controller 229 configured to process digital network signals. MAC controller 229 may be configured to perform a number of functions in the transmission and reception of data packets. For example, during the transmission of data, MAC controller 229 assembles the data to be transmitted into a packet with address and error detection fields. Conversely, during the reception of a packet, MAC controller 229 disassembles the packet and performs address checking and error detection. In addition, MAC controller 229 may perform encoding/decoding of digital signals transmitted over the shared path and performs preamble generation/removal, as well as bit transmission/reception.

In one embodiment, MAC controller 229 is coupled to relay A 230. Relay A is coupled to main system voltage 226. Main system voltage 226 is coupled to a relay B 231 which is coupled to a circuit, referred to herein as the "wake-up circuit" 232. Relay A 230 and relay B 231 are connected to network switch 103 via connector 224. MAC controller 229 may also be directly connected to network switch 103 via connector 224.

In the normal operating mode of client 101, relay A 230 is closed and relay B 231 is open thereby allowing packets of data to be transmitted and received to and from network switch 103. However, when client 101 enters either the hibernation state or the off state, as described in the Background Information section, relay A 230 is open and relay B 231 is closed thereby connecting wake-up circuit 232 to connector 224. Wake-up circuit 232 may refer to a circuit configured to power up client 101 to its normal operating mode upon receiving an indication (voltage and current) from network switch 103 to wake-up client 101. The process of waking up client 101 by network switch 103 may commonly be referred to as "remote wake-up". It is noted that the voltage and current received from network switch 103 to wake-up client 101 by activating wake-up circuit 232 may not cause harm to client 101 if relay A 230 and relay B 231 are in the wrong state since network adapter 223 may be configured to include an overvoltage/overcurrent protection circuit designed to protect client 101 in such a situation.

As stated in the Background Information section, Energy Star has published specifications for the amount of power that a computer system should consume during certain states, such as the hibernation state and the off state. Currently, Energy Star has specified that a computer system should consume no more than 2 watt of power during such states. Energy Star may later publish even more stringent specifications specifying that computer systems consume less than 2 watt of power during such states. Therefore, there is a need in the art to reduce the power consumed by a computer system during the hibernation and the off state to comply with the Energy Star specifications. Less power may be consumed by the computer system during the hibernation or the off state by being remotely woken up. By being remotely woken up, as briefly described above, the requirement for the network subsystem (network interface card) in the computer system to monitor for a magic packet may be removed. By not having the network subsystem monitor for a magic packet, power no longer needs to be supplied to the network subsystem for this purpose. Instead, the magic packet will be monitored by network switch 103 as discussed in further detail below.

Figure 3:
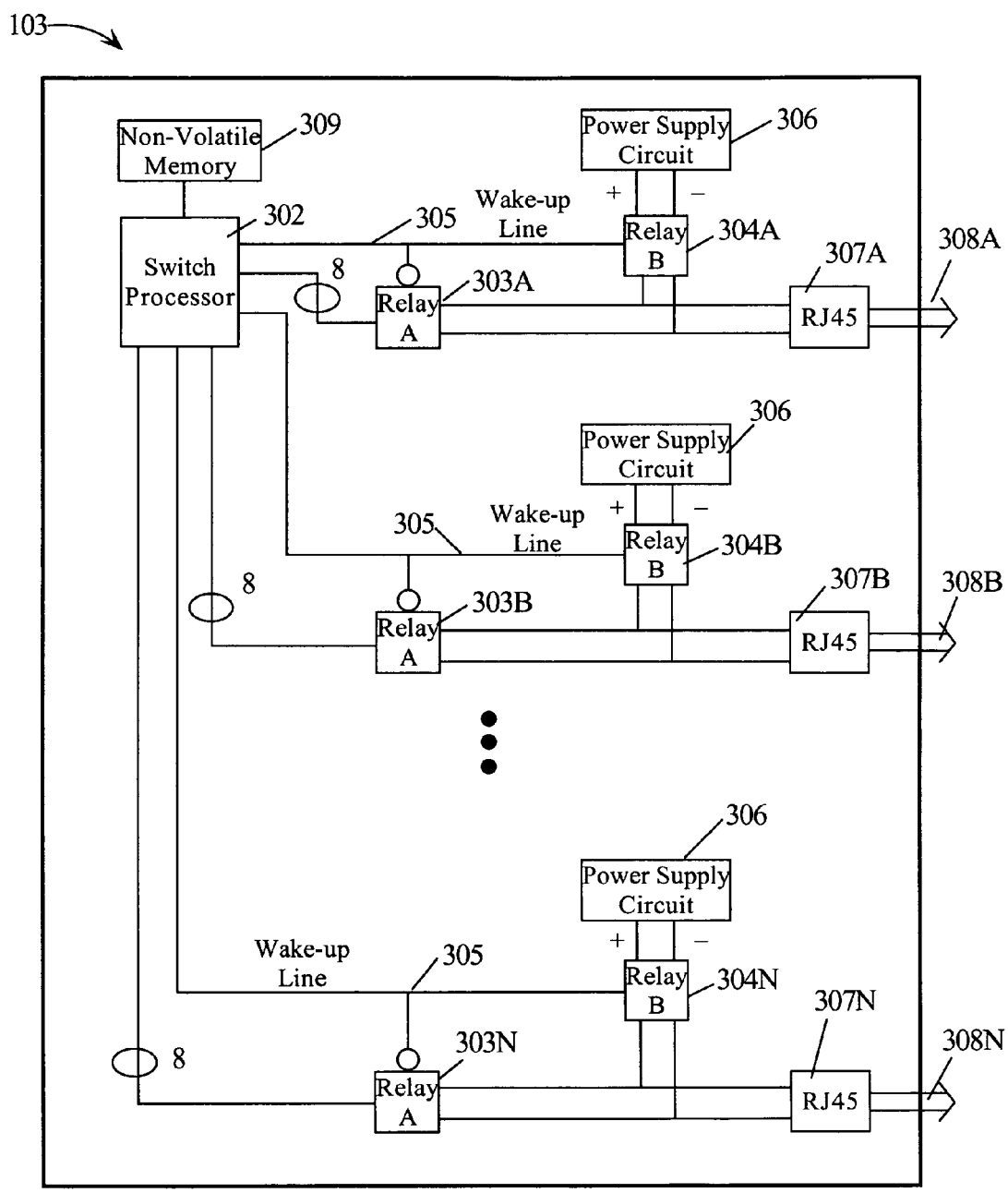
FIG. 3 illustrates an embodiment of the present invention of a network switch in the network system.

FIG. 3—Network Switch

FIG. 3 illustrates an embodiment of the present invention of network switch 103 (FIG. 1). Referring to FIG. 3, network switch 103 may include a switch processor 302 configured to process the packets sent by clients 101. Switch processor 302 is coupled to relay A 303A-N, where N is any number. Relay A 303A-N may collectively or individually be referred to as relays A 303 or relay A 303, respectively. In one embodiment, switch processor 302 is coupled to each relay A 303 via multiple signal lines, e.g., eight lines. Switch processor 302 may further be coupled to relay B 304A-N, where N is any number, via a "wake-up" line 305. Relay B 304A-N may collectively or individually be referred to as relays B 304 or relay B 304, respectively. Relays B may each be coupled to a power supply circuit 306 configured to supply voltage to wake-up circuit 232 (FIG. 2) of a particular client 101 thereby awakening that client 101 as discussed further below. Relays A 303 and relays B 304 may each be coupled to connectors 307A-N, where N is any number. Each connector 307A-N may be connected to a particular port (bi-directional) 308A-N, where N is any number, which is connected to a particular client 101. Connectors 307A-N may collectively or individually be referred to as connectors 307 or connector 307, respectively. Ports 308A-N may collectively or individually be referred to as ports 308 or port 308, respectively. In one embodiment, the number of ports 308, connectors 307, relays A 303 and relays B 304 correspond to the number of clients 101 coupled to network switch 103. In one embodiment, each connector 307 is coupled to a particular client 101 via a particular port 308.

In one embodiment, network switch 103 may further include a memory unit 309, e.g., volatile, non-volatile, coupled to processor 302. Memory unit 309 may be configured to store a particular MAC address received from a particular client 101 via port 308. Switch processor 302 may be configured to associate the received MAC address with a particular port 308 coupled to client 101 that sent the MAC address.

In one embodiment, when client 101 operates in the normal mode of operation, relay B 304, e.g., relay B 304A, associated with that client 101 is open and relay A 303, e.g., relay A 303A, associated with that client 101 is closed thereby allowing switch processor 302 to transmit processed packets to that particular client 101 through the appropriate connector 307, e.g., connector 307A. However, after client 101 enters the hibernation state or the off state, switch processor 302 monitors for a magic packet to awaken that client 101. A magic packet may refer to a frame sent to network switch 103 that includes a destination address, e.g., address of client 101, repeated a certain number of times, e.g., sixteen times, within the packet. Upon receiving a magic packet, switch processor 302 enables or activates the appropriate wake-up line 305 associated with client 101 identified by the magic packet. Upon enabling wake-up line 305, the appropriate relay B 304 is closed and the appropriate relay A 303 is open thereby allowing power to be supplied to client 101 identified by the magic packet from power supply circuit 306 via the appropriate connector 307 and port 308. Once power is supplied to client 101, wake-up circuit 232 (FIG. 2) awakens that client 101.

In one embodiment, network switch 103 may apply power to wake-up circuit 232 of client 101 for a period of time, e.g., two seconds, upon receipt of a magic packet identifying that client 101. After that period of time transpires, switch processor 302 may deassert or disable wake-up line 305 associated with that client 101 thereby opening relay B 304 and closing relay A 303 associated with that client 101. Upon closing the appropriate relay A 303 and opening the appropriate relay B 304, switch processor 302 is able to transmit processed packets to that client 101 via the appropriate connector 307 and port 308.

A method for reducing power consumed by client 101 during either a hibernation state or an off state using the configuration of client 101 (FIG. 2) and network switch 103 (FIG. 3) is described below in association with FIGS. 4A-B.

Figure 4A:
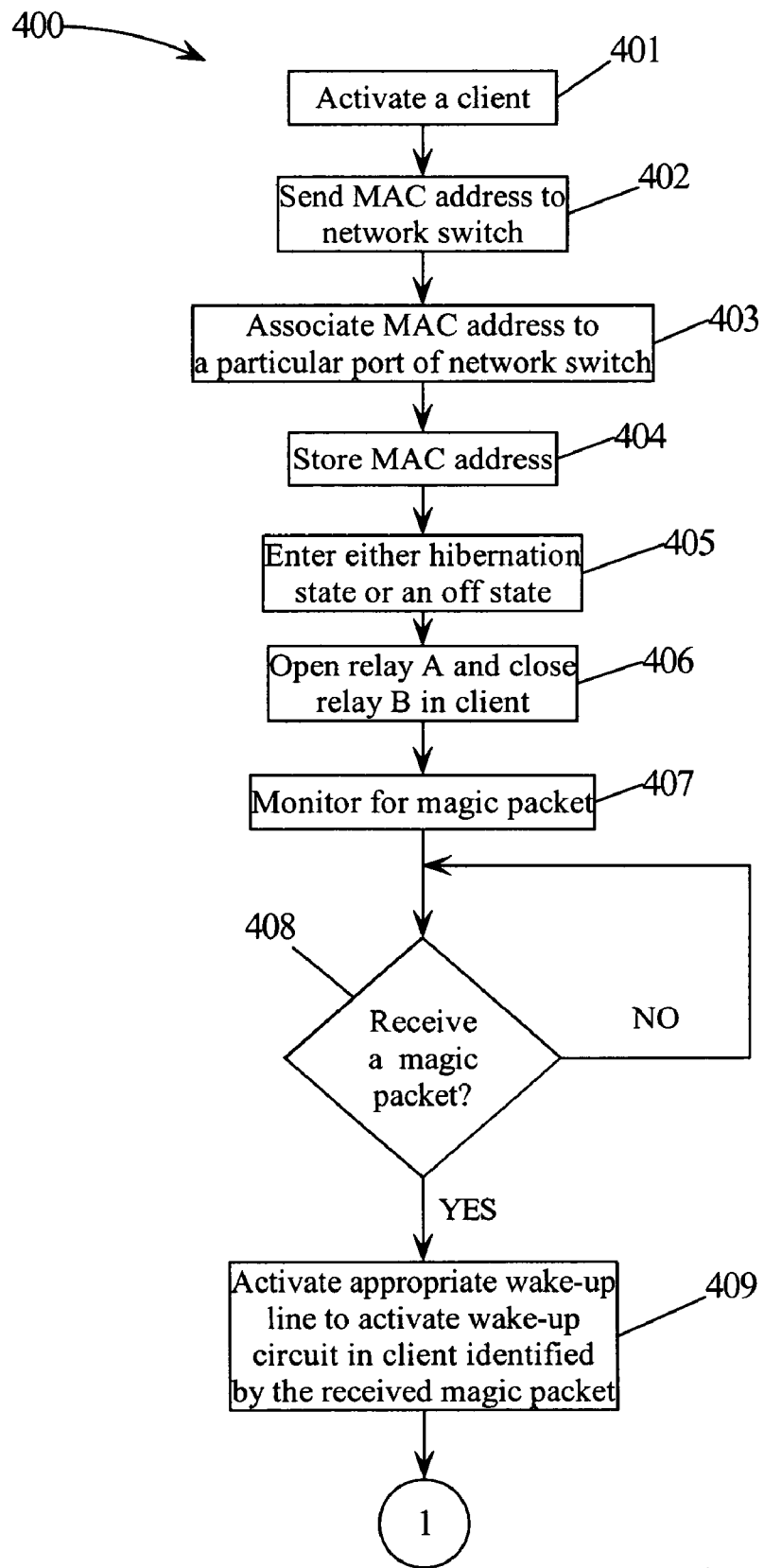
FIGS. 4A-B are a flowchart of a method for reducing power consumed by a client during either a hibernation state or an off state in accordance with an embodiment of the present invention.
Figure 4B:
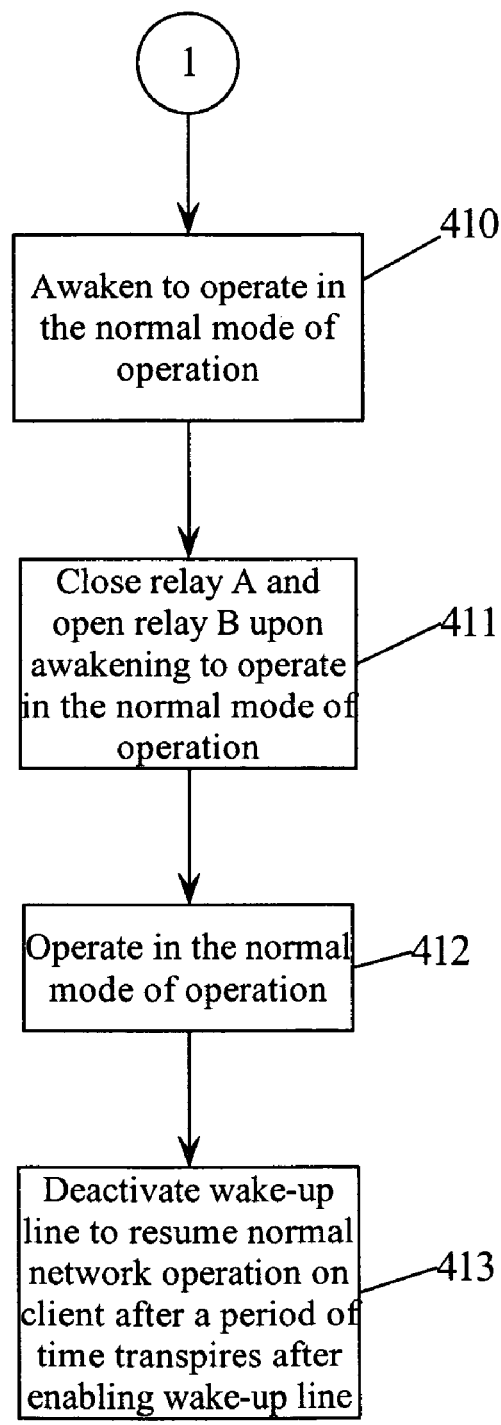

FIGS. 4A-B—Method for Reducing Power Consumed by a Client During Either a Hibernation State or an Off State FIGS. 4A-B are a flowchart of one embodiment of the present invention for a method 400 for reducing power consumed by client 101 (FIGS. 1-2) during either a hibernation state or an off state.

Referring to FIG. 4A, in conjunction with FIGS. 1-3, in step 401, client 101 is initially activated. For example, in an enterprise environment, where clients 101 are desktops used by employees, a newly purchased client 101 may be initially activated by plugging the power cord in an electrical outlet in the wall.

In step 402, the initially activated client 101 sends a MAC address to network switch 103.

In step 403, network switch 103 associates the received MAC address to a particular port 308 coupled to the initially activated client 101. In step 404, network switch 103 stores the MAC address, such as in memory 309.

In step 405, the activated client 101 enters either a hibernation state or an off state. In step 406, the activated client 101 opens relay A 230 and closes relay B 231 upon entering either the hibernation state or the off state.

In step 407, switch processor 302 of network switch 103 monitors for a magic packet. In step 408, a determination is made by switch processor 302 of network switch 103 as to whether a magic packet is received. If a magic packet is not received, then, in step 408, switch processor 302 of network switch 103 determines whether it received a magic packet.

If, however, switch processor 302 of network switch 103 receives a magic packet, then, in step 409, switch processor 302 activates or enables wake-up line 305 thereby activating wake-up circuit 232 of client 101 identified by the received magic packet. That is, switch processor 302 activates or enables wake-up line 305 which closes relay B 304 and opens relay A 303 associated with client 101 identified by the received magic packet. Upon closing relay B 304, power is supplied by power supply circuit 306 to client 101 identified by the received magic packet via connector 307 and port 308 coupled to that client 101. Power is then received by wake-up circuit 232 of client 101 via relay B 231 and connector 224.

Referring to FIG. 4B, in conjunction with FIGS. 1-3, in step 410, upon activating wake-up circuit 232 of client 101, client 101 is awakened to operate in the normal mode of operation. In step 411, upon awakening to operate in the normal mode of operation, relay B 231 is opened and relay A 230 is closed as a function of the voltage supplied by the main system voltage 226. That is, upon awakening to operate in the normal mode of operation, there will be a voltage supplied by the main system voltage 226. The voltage now supplied by the main system voltage 226 will cause relay B 231 to open and relay A 230 to close. In step 412, client 101 operates in the normal mode of operation.

In step 413, after a period of time, e.g., two seconds, transpires after enabling wake-up line 305, switch processor 302 deasserts or disables wake-up line 305 associated with that client 101 thereby opening relay B 304 and closing relay A 303 associated with that client 101. By closing relay A 303, switch processor 302 is able to transmit processed packets to that client 101.

It is noted that method 400 may include other and/or additional steps that, for clarity, are not depicted. It is further noted that method 400 may be executed in a different order presented and that the order presented in the discussion of FIGS. 4A-B are illustrative. It is further noted that certain steps in method 400 may be executed in a substantially simultaneous manner.

Although the system and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for reducing power consumed by a computer system comprising the steps of:
  receiving a media access control address from an activated computer system;
  associating said received media access control address with a particular port;
  entering one of a hibernation state and an off state by said computer system;
  receiving a magic packet that includes a repetitive address that identifies said computer system; and
  remotely activating said computer system from said one of said hibernation state and said off state upon receipt of said magic packet;
  wherein a network switch remotely activates said computer system from said one of said hibernation state and said off state upon receipt of said magic packet, wherein said network switch comprises:
    a processor configured to process packets;
    a plurality of ports coupled to a plurality of computer systems, wherein each of said plurality of ports is associated with a unique media access control address.

2. The method as recited in claim 1, wherein said network switch further comprises:
  a plurality of connectors, wherein each of said plurality of connectors is coupled to one of said plurality of ports;
  a plurality of first relays, wherein each of said plurality of first relays is coupled to one of said plurality of connectors, wherein each of said plurality of first relays is coupled to said processor;
  a plurality of second relays, wherein each of said plurality of second relays is coupled to one of said plurality of connectors, wherein each of said plurality of second relays is coupled to said processor; and
  a power supply circuit coupled to each of said plurality of second relays.

3. The method as recited in claim 2, wherein upon receipt of said magic packet, one of said plurality of first relays is closed and one of said plurality of second relays is opened thereby allowing voltage from said power supply circuit to activate said computer system via one of said plurality of ports connected to said computer system.

4. The method as recited in claim 1, wherein said computer system comprises:
  a media access control controller;
  a connector coupled to said media access control controller and to one of said plurality of ports of said network switch;
  a first relay coupled to said media access control controller;
  a second relay;
  a power supply coupled to said first relay and to said second relay; and
  a circuit coupled to said second relay, wherein said circuit is configured to wake up said computer system from said one of said hibernation state and said off state.

5. The method as recited in claim 4, wherein upon said computer system entering said one of said hibernation state and said off state, said first relay is closed and said second relay is opened thereby allowing said circuit to detect a voltage sent from said network switch.

6. The method as recited in claim 5, wherein upon receipt of said voltage from said network switch, said computer system is activated by said circuit.

7. A system, comprising:
  a network switch comprising:
    a processor configured to process packets;
    a plurality of ports coupled to a plurality of computer systems;
    wherein said processor comprises:
      logic for receiving a media access control address from a computer system of said plurality of computer systems, wherein said computer system enters one of a hibernation state and an off state;

logic for associating said media control address with one of said plurality of ports;

logic for receiving a magic packet that includes a repetitive address that identifies said computer system; and logic for remotely activating said computer system from said one of said hibernation state and said off state upon receipt of said magic packet.

8. The system as recited in claim 7, wherein said processor further comprises:

logic for storing said received media access control address.

9. The system as recited in claim 7, wherein said processor further comprises:

logic for activating a power supply circuit upon receipt of said magic packet.

10. The system as recited in claim 7, wherein said network switch further comprises:

a plurality of connectors, wherein each of said plurality of connectors is coupled to one of said plurality of ports;

a plurality of first relays, wherein each of said plurality of first relays is coupled to one of said plurality of connectors, wherein each of said plurality of first relays is coupled to said processor;

a plurality of second relays, wherein each of said plurality of second relays is coupled to one of said plurality of connectors, wherein each of said plurality of second relays is coupled to said processor; and a power supply circuit coupled to each of said plurality of second relays;

wherein upon receipt of said magic packet, one of said plurality of first relays is closed and one of said plurality of second relays is opened thereby allowing voltage from said power supply circuit to activate said computer system via a port connected to said computer system.

11. The system as recited in claim 7 further comprises:

said computer system coupled to said network switch via one of said plurality of ports, wherein said computer system comprises:

a media access control controller;

a connector coupled to said media access control controller and to said one of said plurality of ports of said network switch;

a first relay coupled to said media access control controller;

a second relay;

a power supply coupled to said first relay and to said second relay; and a circuit coupled to said second relay, wherein said circuit is configured to wake up said computer system from said one of said hibernation state and said off state.

12. The system as recited in claim 11, wherein upon said computer system entering said one of said hibernation state and said off state, said first relay is closed and said second relay is opened thereby allowing said circuit to detect a voltage sent from said network switch.

13. The system as recited in claim 12, wherein upon receipt of said voltage from said network switch, said circuit activates said computer system.

* * * * *